(12) United States Patent
Fujimoto et al.

(10) Patent No.: US 12,168,488 B2
(45) Date of Patent: *Dec. 17, 2024

(54) STEERING HOLDING DETERMINATION DEVICE, STEERING CONTROL DEVICE, AND STEERING DEVICE

(71) Applicant: Hitachi Astemo, Ltd., Hitachinaka (JP)

(72) Inventors: Hirokazu Fujimoto, Hitachinaka-shi, (JP); Tatsuru Niihara, Hitachinaka (JP); Yoshinori Kohno, Hitachinaka (JP); Hiroki Sato, Hitachinaka (JP); Shigeharu Shibahata, Hitachinaka (JP); Daisuke Tsuga, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 268 days.

This patent is subject to a terminal disclaimer.

(21) Appl. No.: 17/748,172

(22) Filed: May 19, 2022

(65) Prior Publication Data
US 2022/0274643 A1    Sep. 1, 2022

Related U.S. Application Data

(63) Continuation of application No. PCT/JP2019/048914, filed on Dec. 13, 2019.

(30) Foreign Application Priority Data

Dec. 6, 2019    (JP) ................. 2019-221577

(51) Int. Cl.
*B62D 6/00*    (2006.01)
*B62D 1/28*    (2006.01)
(Continued)

(52) U.S. Cl.
CPC .......... *B62D 6/008* (2013.01); *B62D 5/0463* (2013.01); *B62D 6/002* (2013.01); *B62D 15/025* (2013.01); *B62D 1/286* (2013.01)

(58) Field of Classification Search
None
See application file for complete search history.

(56) References Cited

U.S. PATENT DOCUMENTS 10,773,750 B2 *    9/2020    Rafaila ................. B60W 40/08
2008/0262676 A1 *    10/2008    Kawakami ........... B62D 15/029
701/41

(Continued)

FOREIGN PATENT DOCUMENTS

CN    103101536 A  *  5/2013    .......... B60K 28/066
CN    103640622 A  *  3/2014
(Continued)

OTHER PUBLICATIONS

International Search Report mailed Feb. 4, 2020 for the corresponding PCT International Patent Application No. PCT/JP2019/048914, 6 pages including English translation.
(Continued)

*Primary Examiner* — Kevin R Steckbauer
(74) *Attorney, Agent, or Firm* — Leason Ellis LLP; Edward J. Ellis; Melvin C. Garner (57) ABSTRACT

A steering holding determination device configured to determine whether a driver holds a steering member, the steering holding determination device including: a predicted value calculation unit configured to sequentially calculate a predicted value of a state quantity with reference to a steering torque and an actual measured value of the state quantity, the state quantity being related to a turning angle of a wheel; and a steering holding determination unit configured to determine whether the driver holds the steering member with reference to the predicted value calculated by the predicted value calculation unit and an actual measured value corresponding to the predicted value.

15 Claims, 6 Drawing Sheets

(51) Int. Cl.
*B62D 5/04* (2006.01)
*B62D 15/02* (2006.01)

(56) References Cited

U.S. PATENT DOCUMENTS

| | | | | |
|---|---|---|---|---|
| 2008/0312791 | A1* | 12/2008 | Knee | B62D 5/0415 180/443 |
| 2015/0094915 | A1 | 4/2015 | Oyama | |
| 2017/0350777 | A1* | 12/2017 | Oschlies | G01L 3/16 |
| 2018/0015919 | A1 | 1/2018 | Hanzawa et al. | |
| 2019/0009816 | A1 | 1/2019 | Moreillon et al. | |
| 2019/0217886 | A1* | 7/2019 | Rohrmoser | B62D 5/001 |
| 2019/0359254 | A1* | 11/2019 | Rafaila | B60W 40/08 |
| 2022/0126863 | A1 | 4/2022 | Moustafa et al. | |
| 2022/0126864 | A1 | 4/2022 | Moustafa et al. | |
| 2022/0126878 | A1 | 4/2022 | Moustafa et al. | |
| 2022/0161815 | A1 | 5/2022 | Van Beek et al. | |
| 2022/0274643 | A1* | 9/2022 | Fujimoto | B62D 6/008 |
| 2022/0281520 | A1* | 9/2022 | Fujimoto | B62D 5/0421 |
| 2023/0008327 | A1* | 1/2023 | Larminy | B62D 6/10 |

FOREIGN PATENT DOCUMENTS

| | | | | |
|---|---|---|---|---|
| CN | 103640622 | B * | 1/2016 | |
| CN | 105531179 | A * | 4/2016 | B62D 15/021 |
| CN | 103101536 | B * | 5/2016 | B60K 28/066 |
| CN | 107303903 | A * | 10/2017 | B60R 16/023 |
| CN | 107303903 | B * | 11/2019 | B60R 16/023 |
| DE | 112015002435 | T5 | 3/2017 | |
| DE | 102016005013 | A1 * | 10/2017 | B60W 40/09 |
| DE | 102017107785 | A1 * | 10/2017 | B60R 16/023 |
| DE | 102016209833 | A1 * | 12/2017 | B62D 15/025 |
| DE | 102014112976 | B4 | 10/2018 | |
| DE | 112020001643 | T5 | 6/2022 | |
| DE | 112019007814 | T5 * | 8/2022 | B62D 5/0421 |
| DE | 112019007822 | T5 * | 8/2022 | B62D 5/0463 |
| EP | 1833716 | B1 * | 2/2012 | B62D 5/0415 |
| EP | 2591942 | A1 * | 5/2013 | B60K 28/066 |
| EP | 3184404 | A2 * | 6/2017 | B62D 5/0409 |
| JP | 2004291736 | A * | 10/2004 | |
| JP | 2005119539 | A * | 5/2005 | |
| JP | 3738673 | B2 * | 1/2006 | |
| JP | 2008221967 | A * | 9/2008 | B60W 40/09 |
| JP | 2010202048 | A * | 9/2010 | |
| JP | 2014196070 | A * | 10/2014 | |
| JP | 6059063 | B2 * | 1/2017 | |
| JP | 2017114324 | A * | 6/2017 | B62D 5/0409 |
| JP | 2019001350 | A * | 1/2019 | B60R 21/00 |
| JP | 2019014468 | A | 1/2019 | |
| JP | 6679801 | B1 * | 4/2020 | B62D 5/0421 |
| JP | 2021091255 | A * | 6/2021 | B62D 5/0463 |
| JP | 2021091256 | A * | 6/2021 | B62D 5/0421 |
| WO | WO-2006069914 | A1 * | 7/2006 | B62D 5/0415 |
| WO | WO-2018151291 | A1 * | 8/2018 | B62D 15/0245 |
| WO | WO-2021111643 | A1 * | 6/2021 | B62D 5/0421 |
| WO | WO-2021111644 | A1 * | 6/2021 | B62D 5/0463 |

OTHER PUBLICATIONS

German Office Action mailed Mar. 14, 2024 for the corresponding German Patent Application No. 112019007822.4 (9 pages including English translation).

* cited by examiner

STEERING HOLDING DETERMINATION DEVICE, STEERING CONTROL DEVICE, AND STEERING DEVICE

CROSS-REFERENCE TO RELATED APPLICATION(S)

This application is a Continuation of International Application No. PCT/JP2019/048914 filed on Dec. 13, 2019, and claims the benefit of priority to Japanese Patent Application No. 2019-221577 filed on Dec. 6, 2019, the contents of all of which are incorporated herein by reference in their entireties.

FIELD OF THE INVENTION

The present invention relates to a steering holding determination device, a steering control device, and a steering device.

BACKGROUND OF THE INVENTION

In related art, a control device which determines a steering angle along a target course of an own vehicle and automatically steers a steering device is known. In a control device which automatically steers the steering device, a technique for performing travel control of a vehicle in consideration of a control error and an intention of a driver has been proposed.

The control device as described above determines whether a steering member is in a steering holding state in which the driver holds the steering member, and controls the cancellation of automatic steering in accordance with an determination result. For example, in JP-A-2019-14468, a driver torque applied to a steering wheel by a driver is estimated in consideration of not only a torsion bar torque and a steering wheel inertia torque but also a gravity torque applied to a first axis by a gravity acting on a center of gravity of the steering wheel.

It is preferable to be possible to more accurately determine whether there is a steering holding state.

SUMMARY OF THE INVENTION

An object of an aspect of the present invention is to provide a technique capable of improving an accuracy of determining whether there is a steering holding state.

In order to solve the above problem, a steering holding determination device according to an aspect of the present invention configured to determine whether a driver holds a steering member, the steering holding determination device including: a predicted value calculation unit configured to sequentially calculate a predicted value of a state quantity with reference to a steering torque and an actual measured value of the state quantity, the state quantity being related to a turning angle of a wheel; and a steering holding determination unit configured to determine whether the driver holds the steering member with reference to the predicted value calculated by the predicted value calculation unit and an actual measured value corresponding to the predicted value.

According to one aspect of the present invention, it is possible to improve an accuracy of determining whether a driver holds a steering member.

DETAILED DESCRIPTION OF THE INVENTION

First Embodiment

Hereinafter, a first embodiment of the present invention will be described in detail.

(Configuration of Vehicle 900)

Figure 1:
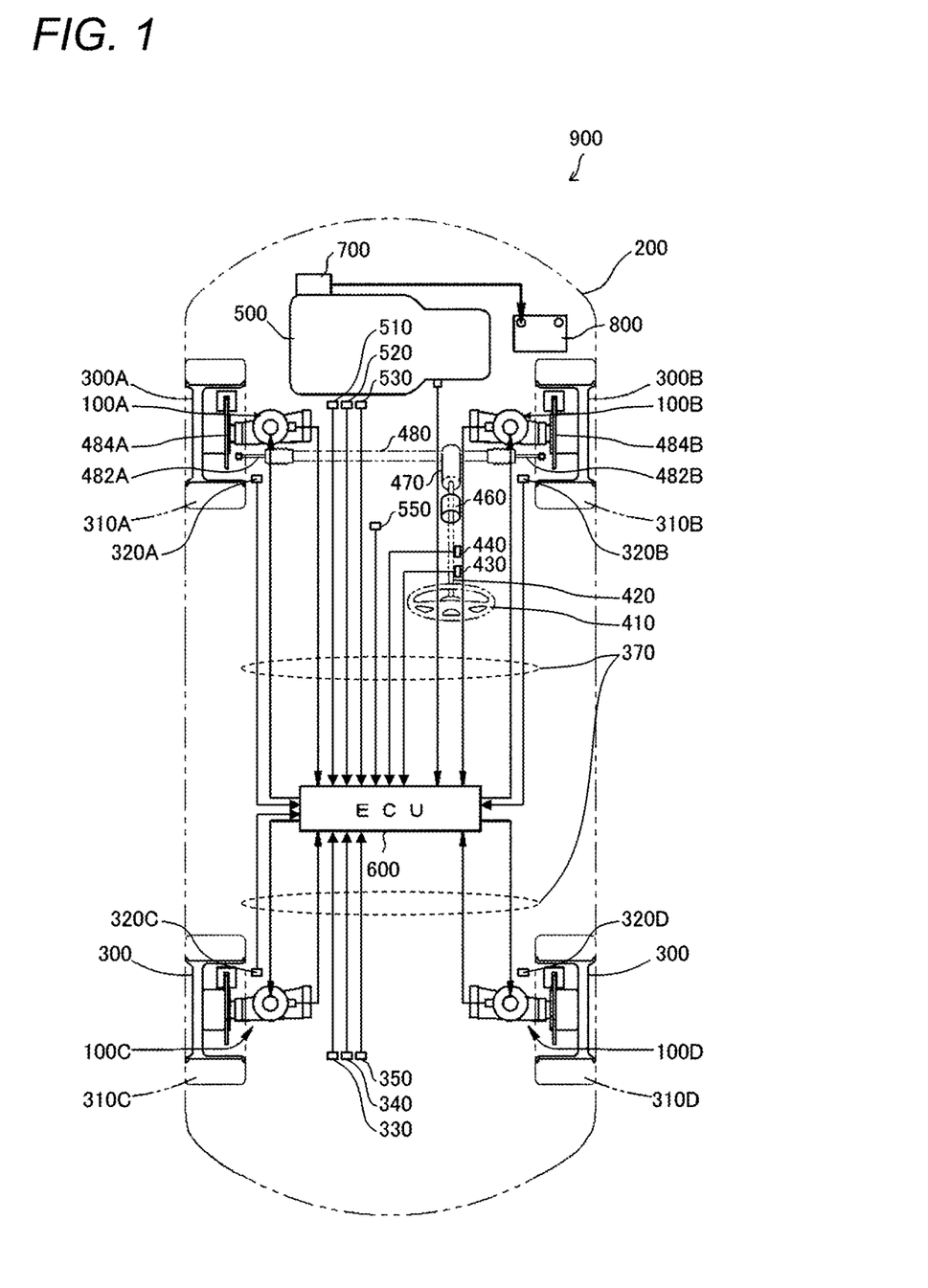
FIG. 1 is a view illustrating a schematic configuration of a vehicle according to an embodiment of the present invention.

FIG. 1 is a view illustrating a schematic configuration of a vehicle 900 according to the present embodiment. As illustrated in FIG. 1, the vehicle 900 includes suspension devices (suspensions) 100, a vehicle body 200, wheels 300, tires 310, a steering member 410, a steering shaft 420, a torque sensor 430, a steering angle sensor 440, a torque application unit 460, a rack-and-pinion mechanism 470, a rack shaft 480, an engine 500, an electronic control unit (ECU) (control device, control unit, steering control device) 600, a power generation device 700, and a battery 800. Here, the suspension device 100 and the ECU 600 constitute a suspension device according to the present embodiment. The steering member 410, the steering shaft 420, the torque sensor 430, the steering angle sensor 440, the torque application unit 460, the rack-and-pinion mechanism 470, the rack shaft 480, and the ECU 600 constitute a steering device according to the present embodiment.

The vehicle 900 is a vehicle which implements normal driving in which the vehicle travels in a steering holding state (hands-on) in which a driver holds and steers the steering member 410, and automatic driving in which the vehicle travels by automatic steering control in a hands-off state (hands-off) in which the driver releases his/her hands from the steering member 410.

The wheel 300 on which the tire 310 is mounted is suspended from the vehicle body 200 by the suspension device 100. Since the vehicle 900 is a four-wheeled vehicle, four suspension devices 100, four wheels 300, and four tires 310 are provided.

The tires and wheels of the left front wheel, the right front wheel, the left rear wheel, and the right rear wheel are also referred to as a tire 310A and a wheel 300A, a tire 310B and a wheel 300B, a tire 310C and a wheel 300C, and a tire 310D and a wheel 300D, respectively. Hereinafter, similarly, configurations respectively attached to the left front wheel, the right front wheel, the left rear wheel, and the right rear wheel may be denoted by reference numerals "A", "B", "C", and "D".

The suspension device 100 includes a hydraulic shock absorber, an upper arm, and a lower arm. As an example, the hydraulic shock absorber includes a solenoid valve which is an electromagnetic valve which adjusts a damping force generated by the hydraulic shock absorber. However, the present embodiment is not limited thereto, and the hydraulic shock absorber may use an electromagnetic valve other than the solenoid valve as the electromagnetic valve which adjusts the damping force. For example, an electromagnetic valve using an electromagnetic fluid (magnetic fluid) may be provided as the electromagnetic valve.

The power generation device 700 is attached to the engine 500, and electric power generated by the power generation device 700 is stored in the battery 800.

The steering member 410 operated by the driver is connected to one end of the steering shaft 420 in a torque transmittable manner, and the other end of the steering shaft 420 is connected to the rack-and-pinion mechanism 470.

The rack-and-pinion mechanism 470 is a mechanism which converts rotation around an axis of the steering shaft 420 into displacement along an axial direction of the rack shaft 480. Specifically, the rack-and-pinion mechanism 470 includes a pinion gear which is connected to the other end of the steering shaft 420 and rotates integrally with the steering shaft 420. The rack shaft 480 is provided with rack teeth which mesh with the pinion gear, and the rack shaft 480 is displaced in the axial direction with rotation of the pinion gear. When the rack shaft 480 is displaced in the axial direction, the wheels 300 (300A, 300B) are turned via tie rods 482 (482A, 482B) and knuckle bars 484 (484A, 484B).

The torque sensor 430 detects a steering torque applied to the steering shaft 420, in other words, a steering torque applied to the steering member 410, and provides a torque sensor signal indicating a detection result to the ECU 600. More specifically, the torque sensor 430 detects a torsion of a torsion bar provided in the steering shaft 420, and outputs the detection result as the torque sensor signal. A well-known sensor such as a Hall IC, an MR element, or a magnetostrictive torque sensor may be used as the torque sensor 430.

In the steering shaft 420, a shaft on a side closer than the torsion bar as viewed from the steering member 410 may be referred to as a first shaft, and a shaft on a side farther than the torsion bar as viewed from the steering member 410 may be referred to as a second shaft. The steering shaft 420 may be configured to include a joint connecting the first shaft and the second shaft, in addition to the first shaft and the second shaft. The steering shaft 420 and the torque application unit 460, which are disposed closer to the steering member 410 than the pinion gear, may be collectively referred to as a column portion. The column portion may include a part of the steering member 410.

The steering angle sensor 440 detects a steering angle of the steering member 410 and provides a detection result to the ECU 600.

During the normal driving in which the driver holds the steering member 410, the torque application unit 460 applies an assist torque or a reaction force torque corresponding to a steering control quantity supplied from the ECU 600 to the steering shaft 420. During the automatic driving in which the vehicle 900 travels in a state in which the driver releases his/her hands from the steering member 410, the torque application unit 460 applies a steering torque corresponding to a steering control quantity supplied from the ECU 600 to the steering shaft 420.

The torque application unit 460 includes an electric motor (assist motor) which generates an assist torque, a reaction force torque, or a steering torque in accordance with a steering control quantity, and a torque transmission mechanism which transmits the torque generated by the assist motor to the steering shaft 420. The torque application unit 460 includes a motor rotation speed sensor which detects a rotation speed of the assist motor and a motor rotation angle sensor which detects a rotation angle of the assist motor.

Specific examples of the "control quantity" in the present specification include a current value, a duty ratio, an attenuation rate, an attenuation ratio, and the like.

In the above description, the term "connection in a torque transmittable manner" refers to connection in such a manner that rotation of one member causes rotation of the other member, and includes, for example, at least a case where the one member and the other member are integrally molded, a case where the other member is directly or indirectly fixed to the one member, and a case where the one member and the other member are connected in such a manner as to interlock with each other via a joint member or the like.

In the above example, the steering device in which the steering member 410 to the rack shaft 480 are mechanically connected at all times is exemplified, but the present embodiment is not limited thereto, and the steering device according to the present embodiment may be, for example, a steer-by-wire type steering device. The matters described below can also be applied to the steer-by-wire type steering device.

In FIG. 1, a so-called column assist type steering device in which a torque application unit is provided on a steering shaft is illustrated, but the present embodiment is not limited thereto. A so-called rack-assist type steering device in which a torque application unit is provided on a rack shaft may be used.

The ECU 600 integrally controls various electronic devices included in the vehicle 900. More specifically, the ECU 600 controls a magnitude of an assist torque or a reaction force torque applied to the steering shaft 420 by adjusting a steering control quantity supplied to the torque application unit 460.

The ECU 600 controls opening and closing of the solenoid valve by supplying a suspension control quantity to the solenoid valve included in the hydraulic shock absorber included in the suspension device 100. In order to enable this control, an electric power line for supplying driving electric power from the ECU 600 to the solenoid valve is provided.

The vehicle 900 includes a wheel speed sensor 320 which is provided for each wheel 300 and detects a wheel speed of each wheel 300, a lateral G sensor 330 which detects a lateral acceleration of the vehicle 900, a longitudinal G sensor 340 which detects a longitudinal acceleration of the vehicle 900, a yaw rate sensor 350 which detects a yaw rate of the vehicle 900, an engine torque sensor 510 which detects a torque generated by the engine 500, an engine rotation speed sensor 520 which detects a rotation speed of the engine 500, and a brake pressure sensor 530 which detects a pressure applied to a brake fluid of a brake device. The vehicle 900 includes a camera 550 which captures an image of surroundings of the vehicle 900 which is referred to in automatic driving. The vehicle 900 is not limited to include the camera 550, and may include a radar or the like which detects a situation around the vehicle 900 which is referred to in automatic driving. Detection results of these various sensors are supplied to the ECU 600.

Although not illustrated, the vehicle 900 includes an antilock brake system (ABS) which is a system for preventing wheel locking during braking, a traction control system (TCS) which prevents idling of wheels during acceleration or the like, and a vehicle stability assist (VSA) controllable braking device which is a vehicle behavior stabilization control system having an automatic brake function for yaw moment control, a brake assist function, and the like during turning.

Here, the ABS, the TCS, and the VSA compare a wheel speed determined in accordance with an estimated vehicle body speed with a wheel speed detected by the wheel speed sensor 320, and determine that the vehicle is in a slip state when values of the two wheel speeds differ by a predetermined value or larger. The ABS, the TCS, and the VSA stabilize a behavior of the vehicle 900 by performing optimal brake control and traction control in accordance with a traveling state of the vehicle 900 through such processing.

Supply of the detection results by the various sensors described above to the ECU 600 and transmission of control signals from the ECU 600 to the respective units are performed via a controller area network (CAN) 370.

A signal supplied to the ECU 600 via the CAN 370 includes, for example, the following signals (parenthesis indicates an acquisition source).

Wheel speed of four wheels (wheel speed sensors 320A to 320D)
Yaw rate (yaw rate sensor 350)
Longitudinal G (longitudinal G sensor 340)
Lateral G (lateral G sensor 330)
Brake pressure (brake pressure sensor 530)
Engine torque (engine torque sensor 510)
Engine rotation speed (engine rotation speed sensor 520)
Steering angle (steering angle sensor 440)
Steering torque (torque sensor 430)
Image of surroundings of vehicle 900 (camera 550)
(ECU 600)

Figure 2:
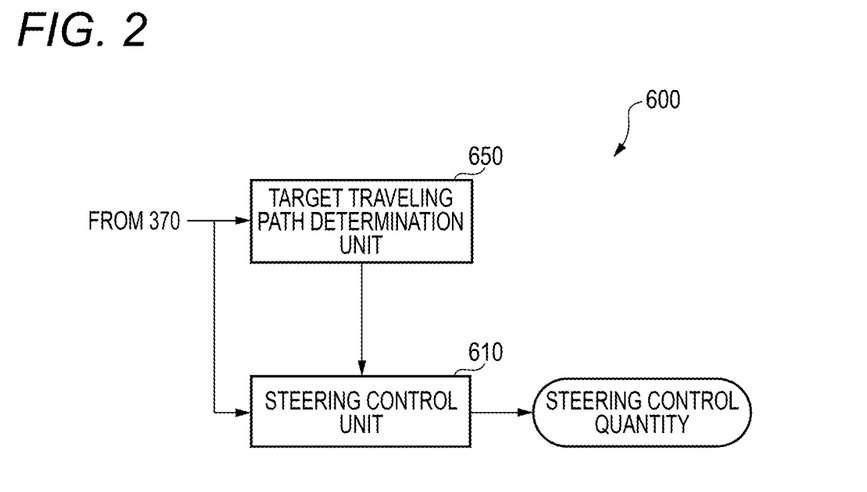
FIG. 2 is a block diagram illustrating a schematic configuration of an ECU according to the embodiment of the present invention.

FIG. 2 is a diagram illustrating a schematic configuration of the ECU 600.

As illustrated in FIG. 2, the ECU 600 includes a steering control unit 610 and a target traveling path determination unit 650. The ECU 600 may be configured to include a steering holding determination device 620 to be described later.

The target traveling path determination unit 650 determines a target traveling path with reference to the detection results of the various sensors included in the CAN 370. The target traveling path determination unit 650 determines a target steering angle with reference to, for example, the image of the surroundings of the vehicle 900 captured by the camera 550 and a road surface condition of the surroundings of the vehicle 900 based on the detection results of the various sensors.

The target traveling path determination unit 650 supplies the determined target steering angle to the steering control unit 610.

The steering control unit 610 determines a magnitude of a steering control quantity to be supplied to the torque application unit 460 with reference to the detection results of the various sensors included in the CAN 370 and the target steering angle determined by the target traveling path determination unit 650.

In the present specification, the expression "with reference to" may include the meaning of "using", "considering", "depending on", and the like.

Processing of "determining the magnitude of the control quantity" includes a case where the magnitude of the control quantity is set to zero, that is, the control quantity is not supplied.

(Steering Control Unit and Steering Holding Determination Device)

Figure 3:
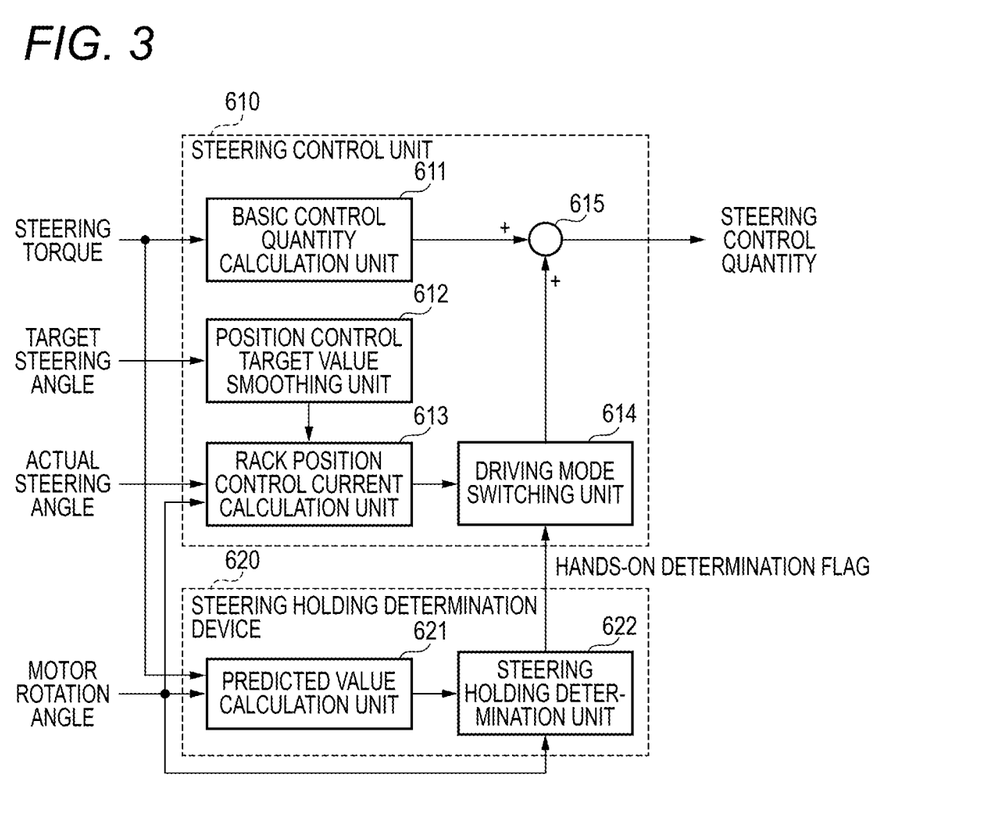
FIG. 3 is a block diagram illustrating a configuration example of a steering control unit according to the embodiment of the present invention.

Next, the steering control unit 610 and the steering holding determination device 620 will be described with reference to FIG. 3. FIG. 3 is a block diagram illustrating a configuration example of the steering control unit 610 and the steering holding determination device 620.

As illustrated in FIG. 3, the steering control unit 610 includes a basic control quantity calculation unit 611, a position control target value smoothing unit 612, a rack position control current calculation unit 613, a driving mode switching unit 614, and an addition unit 615.

The steering holding determination device 620 includes a predicted value calculation unit 621 and a steering holding determination unit 622. The steering holding determination device 620 is a device which determines whether the driver holds the steering member 410.

The basic control quantity calculation unit 611 calculates a basic control quantity for controlling a magnitude of an assist torque or a reaction force torque with reference to a steering torque (actual torque) supplied from the torque sensor 430. The basic control quantity calculated by the basic control quantity calculation unit 611 is supplied to the addition unit 615.

The position control target value smoothing unit 612 generates a smoothed target steering angle by applying a low-pass filter to an input target steering angle, and supplies the generated smoothed target steering angle to the rack position control current calculation unit 613. The position control target value smoothing unit 612 may be configured to remove noise in a preset fixed frequency band, or may be configured to remove noise in a variable frequency band in accordance with the detection results of the various sensors included in the CAN 370.

The rack position control current calculation unit 613 calculates a rack position control quantity corresponding to a rack displacement and a direction of the rack displacement with reference to the input actual steering angle, the smoothed target steering angle, and a motor rotation speed of the assist motor or a rotation speed of the pinion gear. As an example, the rack position control quantity is calculated as a current value. The rack position control current calculation unit 613 supplies the calculated rack position control quantity to the driving mode switching unit 614.

The driving mode switching unit 614 generates a corrected rack position control quantity by correcting the rack position control quantity supplied from the rack position control current calculation unit 613 in accordance with a hands-on determination flag supplied from the steering holding determination device 620.

As an example, when the hands-on determination flag indicates hands-on, the driving mode switching unit 614 reduces the rack position control quantity calculated by the rack position control current calculation unit 613 to generate the corrected rack position control quantity, and outputs the generated corrected rack position control quantity to the addition unit 615.

On the other hand, when the hands-on determination flag indicates hands-off, as an example, the driving mode switching unit 614 outputs the rack position control quantity calculated by the rack position control current calculation unit 613 to the addition unit 615 directly.

The addition unit 615 adds the corrected control quantity supplied from the driving mode switching unit 614 and the basic control quantity calculated by the basic control quantity calculation unit 611, and supplies an added control quantity to the torque application unit 460.

On the other hand, the predicted value calculation unit 621 included in the steering holding determination device 620 sequentially calculates a predicted value of a state quantity related to a turning angle of the wheel with reference to the steering torque and an actual measured value of the state quantity related to the turning angle of the wheel. Here, the predicted value calculation unit 621 may be configured to calculate the predicted value of the state quantity related to the turning angle of the wheel with reference to at least one of a rotation angle of the pinion gear, an angular velocity of the pinion gear, a steering angle, and a steering angular velocity instead of the steering torque or in addition to the steering torque. Examples of the state quantity indicating the turning angle of the wheel include a rotation angle of a motor which turns the wheel, a displacement of a rack shaft connected to the wheel, and the like. The steering holding determination device 620 according to the present embodiment can appropriately determine whether the driver holds the steering member 410 with reference to the state quantity related to the turning angle of the wheel described above.

For example, the predicted value calculation unit 621 sequentially calculates a predicted value of the rotation angle of the pinion gear at a time point $t_{n+1}$ with reference to a steering torque at a time point $t_n$ and an actual measured value of the rotation angle of the pinion gear at the time point $t_n$. Here, a subscript n is an index for designating a time point, and may take any value. As an example, the rotation angle of the pinion gear described above can be calculated by the steering holding determination device 620 with reference to a rotation angle of the assist motor detected by the motor rotation speed sensor included in the torque application unit 460.

The vehicle 900 may be configured to include a stroke sensor which measures a displacement of the rack shaft 480. In this case, the predicted value calculation unit 621 may be configured to sequentially calculate a predicted value of the displacement of the rack shaft 480 at the time point $t_{n+1}$ with reference to an actual measured value by the stroke sensor at the time point $t_n$ instead of the actual measured value of the rotation angle of the pinion gear.

The steering holding determination unit 622 determines whether the driver holds the steering member with reference to the predicted value of the state quantity related to the turning angle of the wheel calculated by the predicted value calculation unit 621 and the actual measured value corresponding to the predicted value.

For example, the steering holding determination unit 622 determines presence or absence of steering holding by the driver with reference to the predicted value of the rotation angle of the pinion gear at the time point $t_{n+1}$ calculated by the predicted value calculation unit 621 and an actual measured value of the rotation angle of the pinion gear at the time point $t_{n+1}$ corresponding to the predicted value. The steering holding determination unit 622 may be configured to determine whether the driver holds the steering member with reference to the predicted value of the displacement of the rack shaft at the time point $t_{n+1}$ calculated by the predicted value calculation unit 621 and an actual measured value of the displacement of the rack shaft at the time point $t_{n+1}$ corresponding to the predicted value.

Then, the steering holding determination unit 622 supplies a hands-on determination flag indicating a result of determining whether the driver holds the steering member 410 to the driving mode switching unit 614. As an example, when the steering holding determination unit 622 determines that the driver holds the steering member 410, the steering holding determination unit 622 sets a value of the hands-on determination flag to 1 and outputs the value, and when the steering holding determination unit 622 determines that the driver does not hold the steering member 410, the steering holding determination unit 622 sets a value of the hands-on determination flag to 0 and outputs the value.

More specifically, the steering holding determination unit 622 may be configured to determine whether the driver holds the steering member 410 in accordance with a difference between the predicted value of the state quantity related to the turning angle of the wheel calculated by the predicted value calculation unit 621 and the actual measured value corresponding to the predicted value.

When the hands-on determination flag is output, the driving mode switching unit 614 switches a driving mode from automatic driving to normal driving, and changes the steering control quantity by outputting a rack position control current in accordance with the driving mode. Before the driving mode is switched from the automatic driving to the normal driving, the ECU 600 may be configured to notify the driver of switching of the mode by generating a sound from a speaker or vibrating the steering member by a vibration unit.

As described above, the ECU 600 (steering control device) includes the steering control unit 610 and the steering holding determination device 620, and changes the steering control quantity in accordance with a determination result of the steering holding determination device 620.

Figure 4:
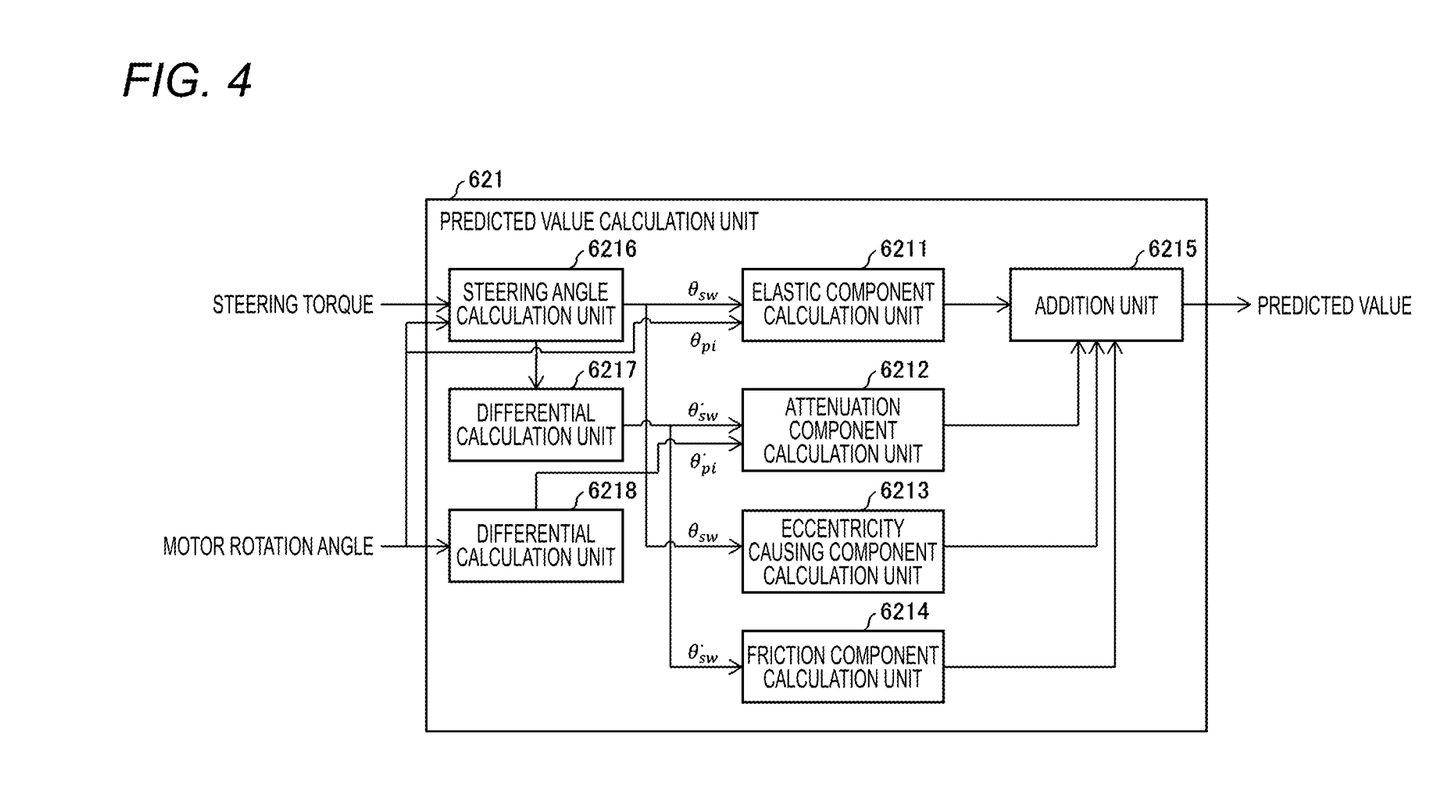
FIG. 4 is a block diagram illustrating a configuration example of a predicted value calculation unit according to the embodiment of the present invention.

FIG. 4 is a diagram illustrating a schematic configuration of the predicted value calculation unit 621 included in the steering holding determination device 620.

The predicted value calculation unit 621 includes an elastic component calculation unit 6211, an attenuation component calculation unit 6212, an eccentricity causing component calculation unit 6213, a friction component calculation unit 6214, an addition unit 6215, a steering angle calculation unit 6216, a differential calculation unit 6217, and a differential calculation unit 6218.

The steering angle calculation unit 6216 calculates a steering angle $\theta_{sw}$ with reference to a steering torque and a rotation angle $\theta_{pi}$ of the pinion gear. As an example, the steering angle calculation unit 6216 calculates a rotation angle of the second shaft based on the rotation angle of the pinion gear, and calculates a torsion angle of the torsion bar by multiplying the steering torque by a reciprocal of a rigidity coefficient of the torsion bar. Then, the steering angle calculation unit 6216 calculates the steering angle $\theta_{sw}$ using the rotation angle of the second shaft and the torsion angle of the torsion bar.

The steering angle calculation unit 6216 may be configured to output a steering angle detected by the steering angle sensor 440 as the steering angle $\theta_{sw}$.

The differential calculation unit 6217 calculates a steering angular velocity by performing time differential calculation (time difference calculation) on the steering angle $\theta_{sw}$ calculated by the steering angle calculation unit 6216. In the present specification, the steering angular velocity may be expressed as a "dotted $\theta_{sw}$" using a dot indicating a time differential.

The differential calculation unit 6218 calculates a motor angular velocity by performing time differential calculation (time difference calculation) on the rotation angle $\theta_{pi}$ of the pinion gear. In the present specification, the motor angular velocity may be expressed as a "dotted $\theta_{pi}$" using a dot indicating a time differential.

The elastic component calculation unit 6211 calculates an elastic component associated with turning of the wheel by multiplying a difference between the steering angle $\theta_{sw}$ and the rotation angle $\theta_{pi}$ of the pinion gear by a spring coefficient K, and supplies the calculated elastic component to the addition unit 6215.

The attenuation component calculation unit 6212 calculates an attenuation component associated with the turning of the wheel by multiplying a difference between the dotted $\theta_{sw}$ and the dotted $\theta_{pi}$ by an attenuation coefficient D, and supplies the calculated attenuation component to the addition unit 6215.

The eccentricity causing component calculation unit 6213 calculates an eccentricity causing component of the steering member 410 by dividing a product of a sine of the steering angle $\theta_{sw}$ multiplied by a constant $d_{ecc}$ and a gravitational acceleration g by an inertia (moment of inertia) $I_{sw}$ of the steering member 410. Then, the calculated eccentricity causing component is supplied to the addition unit 6215. Here, the constant $d_{ecc}$ is a constant indicating a distance from a rotation center of the steering member 410 to a center of gravity of the steering member 410.

The friction component calculation unit 6214 calculates a friction component associated with the turning of the wheel by calculating linear combination of a tangent hyperbolic of the dotted $\theta_{sw}$ and the dotted $\theta_{sw}$, and supplies the calculated friction component to the addition unit 6215. Friction coefficients used for the linear combination may be referred to as $p_1$, $p_2$, and $p_3$.

The addition unit 6215 calculates a predicted value of the state quantity related to the turning angle of the wheel by adding at least two components among (1) the elastic component associated with the turning of the wheel, (2) the attenuation component associated with the turning of the wheel, (3) the eccentricity causing component of the steering member, and (4) the friction component associated with the turning of the wheel, which are acquired. Addition processing by the addition unit 6215 may include an addition processing after adding a negative sign to a certain component, that is, subtraction processing. Examples of the state quantity associated with the turning of the wheel, such as (1) the elastic component associated with the turning of the wheel, (2) the attenuation component associated with the turning of the wheel, and (4) the friction component associated with the turning of the wheel, include a state quantity generated by the column portion.

An example of an equation of state calculated by the predicted value calculation unit 621 having the above configuration is as follows.

[Formula 1]
$$\frac{d}{dt}\begin{pmatrix}\theta_{sw}\\ \dot{\theta}_{sw}\\ \theta_{pi}\\ \dot{\theta}_{pi}\end{pmatrix} = \begin{pmatrix}\dot{\theta}_{sw}\\ K(-\theta_{sw}+\theta_{pi})+D(-\dot{\theta}_{sw}+\dot{\theta}_{pi})-\text{friction}-\\ d_{ecc}g\sin\theta_{sw}/I_{sw}\\ \dot{\theta}_{pi}\\ K(\theta_{sw}+\theta_{pi})+D(\dot{\theta}_{sw}+\dot{\theta}_{pi})/I_{pi}\end{pmatrix} + \begin{pmatrix}0\\ 0\\ 0\\ 1/I_{pi}\end{pmatrix}u \quad (1)$$

$$\text{friction} = p_1(\tanh\dot{\theta}_{sw}p_2 + p_3\dot{\theta}_{sw})$$

As can be seen from the above equation, the above equation of state includes $K(-\theta_{sw}+\theta_{pi})$ [Formula 2]

and $K(\theta_{sw}-\theta_{pi})$ [Formula 3]

as the elastic component, $D(-\dot{\theta}_{sw}+\dot{\theta}_{pi})$ [Formula 4]

and $D(\dot{\theta}_{sw}-\dot{\theta}_{pi})/I_{pi}$ [Formula 5]

as the attenuation component, $d_{ecc}g \sin \theta_{sw}/I_{sw}$ [Formula 6]

as the eccentricity causing component, and $p_i(\tanh \dot{\theta}_{sw}p_2+p_3\dot{\theta}_{sw})$ [Formula 7]

as the friction component.

The steering holding determination device 620 according to the present embodiment can appropriately determine whether the driver holds the steering member 410 by calculating the predicted value of the state quantity related to the turning angle of the wheel using the equation of state described above.

The steering holding determination device 620 according to the present embodiment can express basic characteristics of an actual machine with a simple model by using the elastic component, the attenuation component, and the friction component described above in calculating the predicted value of the state quantity.

When calculating the predicted value of the state quantity, the steering holding determination device 620 according to the present embodiment can detect a hands-on state with high accuracy even for a steering wheel whose center of gravity is not a center due to a shape of the steering wheel or the like by using the eccentricity causing component described above.

When calculating the predicted value of the state quantity, the steering holding determination device 620 according to the present embodiment can detect the hands-on state with high accuracy by using the friction coefficients $p_1$, $p_2$, and $p_3$ described above.

Here, the respective expressions appearing in the equation of state including those already described are summarized as follows.

$\theta_{sw}$: steering angle
Dotted $\theta_{sw}$: steering angular velocity
$\theta_{pi}$: rotation angle of pinion gear
Dotted $\theta_{pi}$: angular velocity of pinion gear
K: elastic coefficient
D: attenuation coefficient
$d_{ecc}$: constant indicating distance from rotation center of steering member to center of gravity of steering member
g: gravitational acceleration
$I_{sw}$: inertia (moment of inertia) of steering member
u: steering torque
$p_1$, $p_2$, $p_3$: friction coefficient In addition, the following components other than the constant in the above expressions are examples of the state quantity to be calculated by the predicted value calculation unit 621 in the present specification.

$\theta_{sw}$: steering angle
Dotted $\theta_{sw}$: steering angular velocity
$\theta_{pi}$: rotation angle of pinion gear
Dotted $\theta_{pi}$: angular velocity of pinion gear
u: steering torque Each state quantity to be calculated by the predicted value calculation unit 621 may be based on an actual measured value acquired from the detection results of the various sensors included in the CAN 370, or may be an estimated value derived using a Kalman filter which is a state estimation method for time-series data. A method for calculating the estimated value using the Kalman filter will be described later.

[Flow of Processing by Steering Holding Determination Device]

Figure 5:
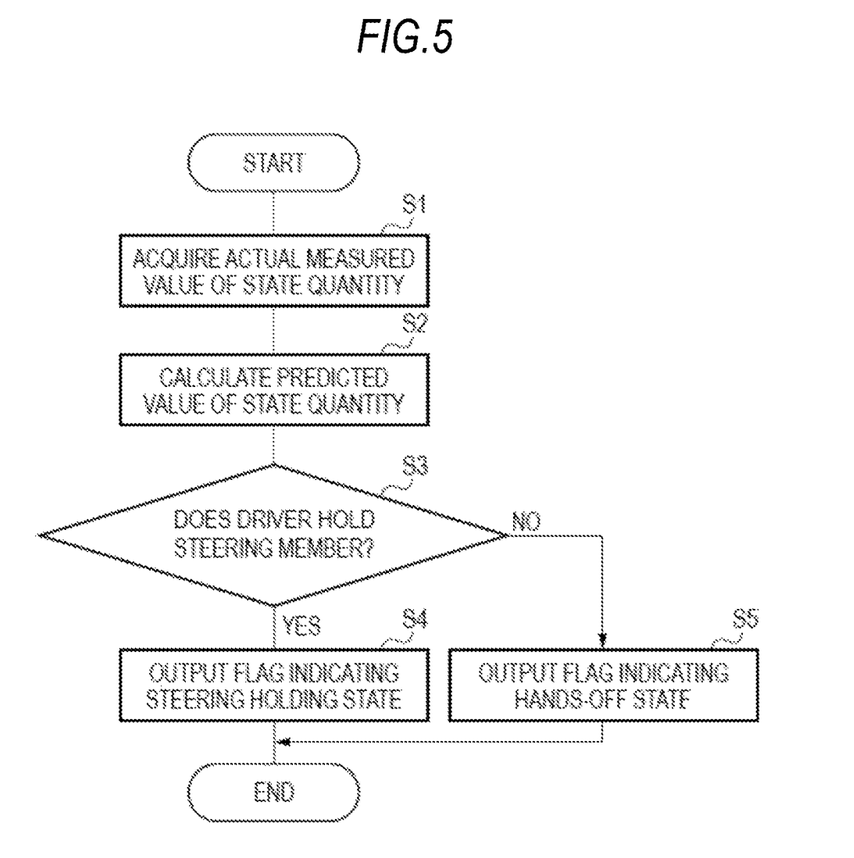
FIG. 5 is a flowchart illustrating a flow of processing of a steering holding determination device.

FIG. 5 is a flowchart illustrating an example of a flow of processing by the steering holding determination device 620.

(Step S1)

The predicted value calculation unit 621 of the steering holding determination device 620 acquires an actual measured value of each state quantity. As an example, the predicted value calculation unit 621 acquires a steering torque (actual torque) at the time point $t_n$ supplied from the torque sensor 430. The predicted value calculation unit 621 acquires an actual measured value of a rotation angle of the pinion gear at the time point $t_n$ supplied from the motor rotation angle sensor included in the torque application unit 460.

(Step S2)

Subsequently, the predicted value calculation unit 621 calculates a predicted value of each state quantity with reference to the actual measured value of each state quantity acquired in step S1. As an example, the predicted value calculation unit 621 calculates a predicted value of the rotation angle of the pinion gear at the time point $t_{n+1}$ when the driver is assumed to be in a hands-off state with reference to the steering torque at the time point $t_n$ and the actual measured value of the rotation angle of the pinion gear at the time point $t_n$.

(Step S3)

Subsequently, the steering holding determination unit 622 of the steering holding determination device 620 determines whether the driver holds the steering member 410 with reference to the predicted value calculated by the predicted value calculation unit 621 and an actual measured value corresponding to the predicted value. As an example, the steering holding determination unit 622 acquires the actual measured value of the rotation angle of the pinion gear at the time point $t_{n+1}$ supplied from the motor rotation angle sensor. The steering holding determination unit 622 determines whether the driver holds the steering member 410 with reference to the actual measured value of the rotation angle of the pinion gear at the time point $t_{n+1}$ and the predicted value of the rotation angle of the pinion gear at the time point $t_n$ calculated in step S2.

More specifically, the steering holding determination unit 622 may be configured to determine that the driver holds the steering member 410 when an absolute value of a difference between the actual measured value of the rotation angle of the pinion gear at the time point $t_{n+1}$ and the predicted value of the rotation angle of the pinion gear at the time point $t_{n+1}$ calculated in step S2 is equal to or larger than a predetermined threshold value.

When the steering holding determination unit 622 determines that the driver holds the steering member 410 (YES in step S3), the processing proceeds to step S4. When the steering holding determination unit 622 determines that the driver does not hold the steering member 410 (NO in step S3), the processing proceeds to step S5.

(Step S4)

The steering holding determination unit 622 outputs a flag indicating a steering holding state in which the driver holds the steering member 410 (hands-on flag). As an example, the steering holding determination unit 622 outputs a hands-on determination flag having a value of 1.

(Step S5)

The steering holding determination unit 622 outputs a flag indicating a hands-off state in which the driver does not hold the steering member 410 (hands-off flag). As an example, the steering holding determination unit 622 outputs a hands-on determination flag having a value of 0.

As described above, the steering holding determination device 620 calculates the predicted value of the rotation angle of the pinion gear when the driver is assumed to be in the hands-off state, and compares the predicted value of the rotation angle of the pinion gear with the actual measured value of the rotation angle of the pinion gear supplied from the motor rotation angle sensor. Then, in accordance with a result of comparison, it is determined whether the driver holds the steering member 410.

In a flow of the processing by the steering holding determination device 620 described above, the predicted value calculation unit 621 may be configured to acquire an actual measured value of a displacement of the rack shaft 480 from the stroke sensor included in the vehicle 900, instead of the actual measured value and the predicted value of the rotation angle of the pinion gear. In this case, it is determined whether the driver holds the steering member 410 using the actual measured value and a predicted value of the displacement of the rack shaft 480.

The predicted value calculation unit 621 may be configured to sequentially calculate an estimated value of the state quantity using the Kalman filter, and in step S3, the steering holding determination unit 622 may be configured to determine whether the driver holds the steering member 410 in accordance with the predicted value calculated by the predicted value calculation unit 621, a variance of the predicted value, and an updated value using the actual measured value corresponding to the predicted value.

The steering holding determination device 620 according to the present embodiment can appropriately determine whether the driver holds the steering member 410 with reference to the above-described predicted value, the variance of the above-described predicted value, and the updated value using the actual measured value corresponding to the above-described predicted value.

In the steering holding determination device 620 according to the present embodiment, it is possible to detect the hands-on state with high accuracy without adding a special sensor.

Hereinafter, a configuration in which the predicted value calculation unit 621 sequentially calculates the estimated value of the state quantity using the Kalman filter will be described in more detail.

[Flow of Estimated Value Calculation Processing by Kalman Filter]

Figure 6:
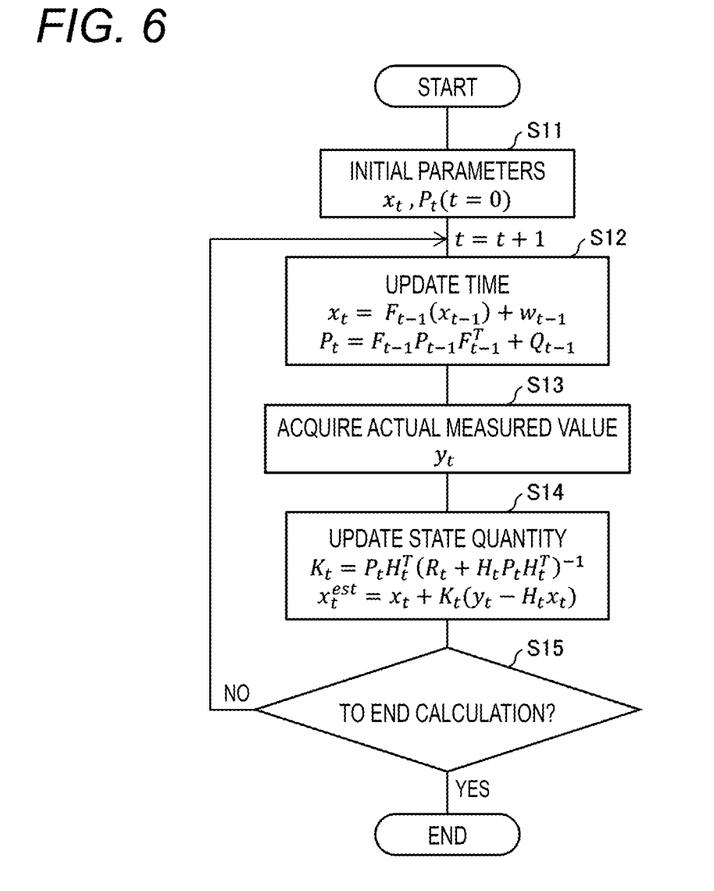
FIG. 6 is a flowchart illustrating a flow of processing of a Kalman filter.

FIG. 6 is a flowchart illustrating a flow of sequential calculation processing of the estimated value using the Kalman filter.

(Step S11)

First, the predicted value calculation unit 621 determines state quantities $x_t$ (t=0) and $P_t$ (t=0) at a time point t=0 as initial parameters. Here, as the state quantity $x_t$ (t=0), an initial value of any one of the state quantities exemplified in relation to the equation of state can be used, and as an example, an initial value of a rotation angle of the pinion gear can be used. $P_t$ represents an analysis error covariance matrix at the time point t. Hereinafter, $P_t$ is also simply referred to as a covariance matrix.

(Step S12)

Subsequently, the predicted value calculation unit 621 increments the time point t to t+1 and calculates a predicted value $x_t$ of a state quantity and the covariance matrix $P_t$ based on the following equations (2) and (3).

[Formula 8]

$$x_t F_{t-1}(x_{t-1}) + (w_{t-1}) \quad (2)$$

$$P_t = F_{t-1} P_{t-1} F_{t-1}^T + Q_{t-1} \quad (3)$$

Here, $F_{t-1}(\Psi)$ represents a linear or non-linear operator giving time evolution of a state quantity $x_{t-1}$, $w_{t-1}$ represents an error term accompanying the time evolution, and $Q_t$ represents an error term due to process noise. A superscript T indicates that a transposed matrix is taken.

(Step S13)

Next, the predicted value calculation unit 621 acquires an actual measured value $y_t$ of each state quantity in a traveling state of the vehicle 900 at the time point t via the CAN 370. Here, as the actual measured value $y_t$ of the state quantity, an actual measured value of any one of the state quantities exemplified in relation to the equation of state can be used, and as an example, an actual measured value of the rotation angle of the pinion gear can be used.

(Step S14)

Next, the predicted value calculation unit 621 calculates a Kalman gain $K_t$ with the following equation (4) by using the covariance matrix $P_t$ calculated in step S12.

[Formula 9]

$$K_t = P_t H_t^T (R_t + H_t P_t H_t^T)^{-1} \quad (4)$$

Here, $R_t$ represents an error variance. $H_t$ represents an observation matrix, and is a matrix for extracting a part of state quantities to be observed from all state quantities. The superscript "−1" indicates that an inverse matrix is taken.

Next, the predicted value calculation unit 621 calculates an updated value $x_t^{est}$ of the state quantity $x_t$ at the time point t by the following equation (5) using the predicted value $x_t$ of the state quantity calculated in step S12, the actual measured value $y_t$ of each state quantity acquired in step S13, and the Kalman gain $K_t$ calculated by the above equation (4).

[Formula 10]

$$x_t^{est} = x_t + K_t (y_t - H_t x_t)) \quad (5)$$

Figure 7:
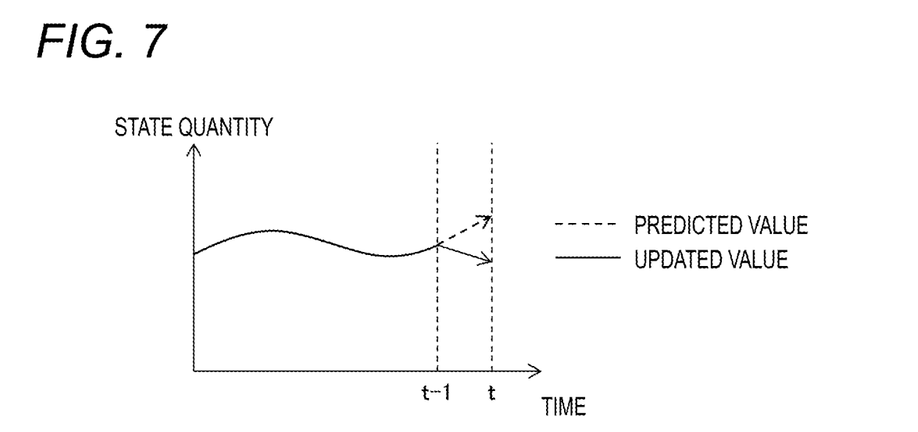
FIG. 7 is a graph schematically illustrating an example of a relationship between a predicted value and an updated value calculated by the predicted calculation unit according to the embodiment of the present invention.

FIG. 7 is a graph schematically illustrating a relationship between the predicted value $x_{t-1}$ at a time point t−1 calculated by the predicted value calculation unit 621 for a certain state quantity, the predicted value $x_t$ obtained by temporally developing the predicted value $x_{t-1}$, and $x_t^{est}$ obtained by adding the actual measured value $y_t$ to the predicted value $x_t$.

(Step S15)

Next, in step S15, the predicted value calculation unit 621 determines whether to end calculation, and ends the flow when the calculation is to be ended, and returns to step S12 when the calculation is not to be ended, and continues the calculation using the update value $x_t^{est}$ as $x_t$.

In this manner, the predicted value calculation unit 621 sequentially calculates a predicted value and a variance (covariance) of each state quantity, and sequentially calculates an updated value with reference to the predicted value. Then, the steering holding determination unit 622 determines whether the driver holds the steering member 410 in accordance with the predicted value calculated by the predicted value calculation unit 621, the variance of the predicted value, and the updated value using an actual measured value corresponding to the predicted value.

As an example, the steering holding determination unit 622 calculates a Mahalanobis distance between the predicted value $x_t$ calculated by the predicted value calculation unit 621 and the updated value $x_t^{est}$ corresponding to the predicted value $x_t$ and using the actual measured value $y_t$ corresponding to the predicted value $x_t$, and determines that the driver holds the steering member 410 when the calculated Mahalanobis distance is equal to or larger than a predetermined threshold value.

Here, a Mahalanobis distance $D_{MAH}$ between the predicted value and the updated value of a certain state quantity can be obtained by dividing an Euclidean distance $D_{EUC}$ between the predicted value and the updated value by a square root (standard deviation) of a variance when the certain state quantity is one variable.

When the steering holding determination device 620 according to the present embodiment can estimate characteristics closer to the actual machine and improve a detection accuracy of the hands-on state by incorporating a nonlinear element as described above in calculating the predicted value $x_t$ of the state quantity.

Figure 8:
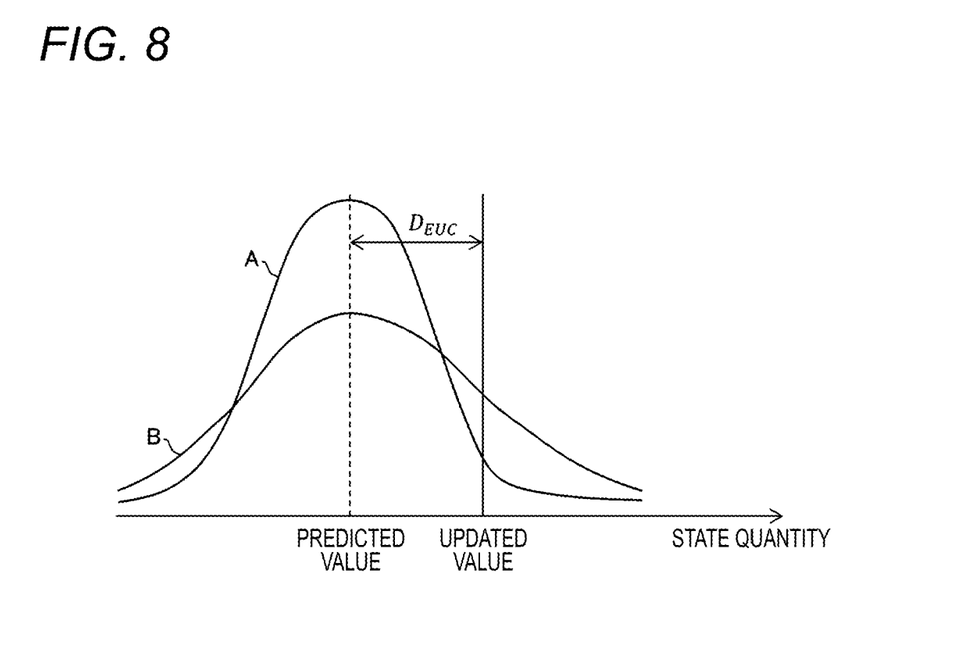
FIG. 8 is a graph schematically illustrating an example of a relationship between a predicted value and an updated value calculated by the predicted calculation unit according to the embodiment of the present invention.

FIG. 8 is a graph schematically illustrating a case where a variance is relatively large and a case where a variance is relatively small with respect to a certain state quantity. A graph A illustrates the case where the variance is relatively small, and a graph B illustrates a case where the variance is relatively large. Even if the Euclidean distance $D_{EUC}$ between the predicted value and the updated value is the same value, the Mahalanobis distance $D_{MAH}$ between the predicted value and the updated value is smaller when the variance is relatively large than when the variance is relatively small.

Figure 9:
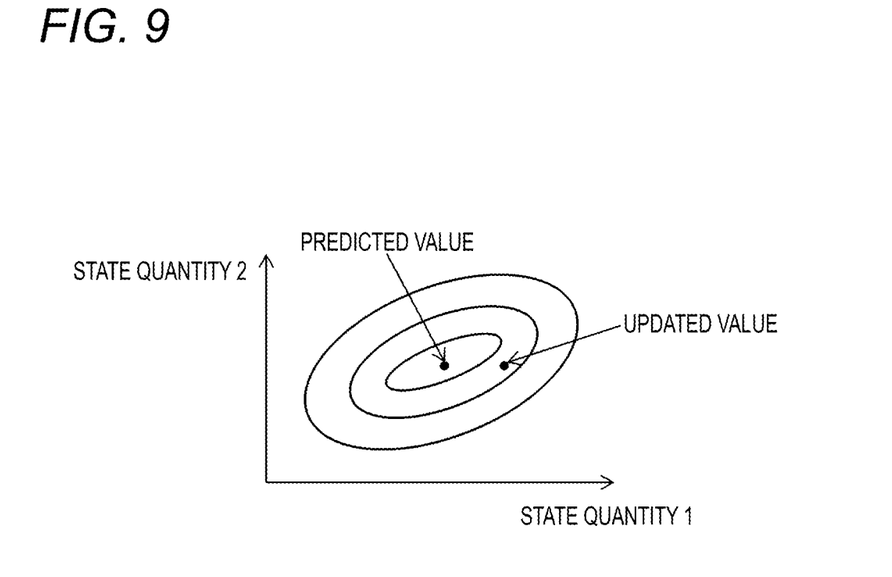
FIG. 9 is a graph schematically illustrating an example of a relationship between a predicted value and an updated value calculated by the predicted calculation unit according to the embodiment of the present invention.

More generally, when a state quantity is a multivariable, as illustrated in FIG. 9, a Mahalanobis distance can be obtained using a predicted value (predicted value vector), an updated value (updated value vector), and a covariance in a state quantity space.

In this manner, the steering holding determination unit 622 according to the present embodiment can determine a distance between the predicted value and the updated value in consideration of a variance of the predicted value calculated by the predicted value calculation unit 621, and thus can more appropriately determine whether the driver holds the steering member 410.

[Example of Implementation by Software]

Control blocks (the steering control unit 610 and the steering holding determination device 620) of the ECU 600 may be implemented by a logic circuit (hardware) formed in an integrated circuit (IC chip) or the like, or may be implemented by software using a central processing unit (CPU).

In the latter case, the ECU 600 includes a CPU which executes instructions of a program which is software implementing each function, a read only memory (ROM) or a storage device (these are referred to as a "recording medium") in which the program and various data are recorded so as to be readable by a computer (or a CPU), a random access memory (RAM) in which the program is loaded, and the like. The object of the present invention is achieved by the computer (or the CPU) reading the program from the recording medium and executing the program. Examples of the recording medium include "a non-transitory tangible medium" such as a tape, a disk, a card, a semiconductor memory, and a programmable logic circuit. The program may be supplied to the computer via any transmission medium (such as a communication network or a broadcast wave) capable of transmitting the program. The present invention can also be implemented in a form of a data signal embedded in a carrier wave in which the program is embodied by electronic transmission.

The present invention is not limited to the embodiment described above, various modifications can be made within the scope of the claims, and an embodiment obtained by appropriately combining technical means disclosed in different embodiments is also included in the technical scope of the present invention.

The invention claimed is:

1. A steering holding determination device configured to determine whether a driver holds a steering wheel, the steering holding determination device comprising:
a processor, wherein
the processor is configured to:
sequentially calculate a predicted value of a state quantity with reference to a steering torque and an actual measured value of the state quantity, the state quantity being related to a turning angle of a wheel; and
determine whether the driver holds the steering wheel with reference to the predicted value calculated by the processor and an actual measured value of the state quantity measured at a time corresponding to the predicted value, and
the state quantity is a displacement of a rack shaft connected to the wheel.

2. The steering holding determination device according to claim 1,
wherein the state quantity is a rotation angle of a motor which turns the wheel.

3. The steering holding determination device according to claim 1,
wherein the processor determines whether the driver holds the steering wheel in accordance with a difference between the predicted value calculated by the processor and the actual measured value of the state quantity measured at the time corresponding to the predicted value.

4. A steering control device comprising:
the steering holding determination device according to claim 1,
wherein a steering control quantity is changed in accordance with a determination result of the steering holding determination device.

5. A steering device comprising: the steering control device according to claim 4.

6. The steering holding determination device according to claim 2,
wherein the processor determines whether the driver holds the steering wheel in accordance with a difference between the predicted value calculated by the processor and the actual measured value of the state quantity measured at the time corresponding to the predicted value.

7. The steering holding determination device according to claim 2,
wherein the processor determines whether the driver holds the steering wheel in accordance with the predicted value calculated by the processor, a variance of the predicted value, and an updated value using the actual measured value of the state quantity measured at the time corresponding to the predicted value.

8. The steering holding determination device according to claim 2,
wherein an equation of state used by the processor includes at least one of:
an elastic component associated with turning of the wheel;
an attenuation component associated with the turning of the wheel;
a component caused by eccentricity of the steering wheel; and
a friction component associated with the turning of the wheel.

9. The steering holding determination device according to claim 3,
wherein an equation of state used by the processor includes at least one of:
an elastic component associated with turning of the wheel;
an attenuation component associated with the turning of the wheel;
a component caused by eccentricity of the steering wheel; and
a friction component associated with the turning of the wheel.

10. A steering control device comprising:
the steering holding determination device according to claim 2,
wherein a steering control quantity is changed in accordance with a determination result of the steering holding determination device.

11. A steering control device comprising:
the steering holding determination device according to claim 3,
wherein a steering control quantity is changed in accordance with a determination result of the steering holding determination device.

12. A steering holding determination device configured to determine whether a driver holds a steering wheel, the steering holding determination device comprising:
a processor, wherein
the processor is configured to:
sequentially calculate a predicted value of a state quantity with reference to a steering torque and an actual measured value of the state quantity, the state quantity being related to a turning angle of a wheel; and
determine whether the driver holds the steering wheel with reference to the predicted value calculated by the processor and an actual measured value of the state quantity measured at a time corresponding to the predicted value, and
the processor determines whether the driver holds the steering wheel in accordance with the predicted value calculated by the processor, a variance of the predicted value, and an updated value using the actual measured value of the state quantity measured at the time corresponding to the predicted value.

13. The steering holding determination device according to claim 12,
wherein an equation of state used by the processor includes at least one of:
an elastic component associated with turning of the wheel;
an attenuation component associated with the turning of the wheel;

a component caused by eccentricity of the steering wheel; and a friction component associated with the turning of the wheel.

14. A steering control device comprising:

the steering holding determination device according to claim 12, wherein a steering control quantity is changed in accordance with a determination result of the steering holding determination device.

15. A steering holding determination device configured to determine whether a driver holds a steering wheel, the steering holding determination device comprising:

a processor, wherein the processor is configured to:

sequentially calculate a predicted value of a state quantity with reference to a steering torque and an actual measured value of the state quantity, the state quantity being related to a turning angle of a wheel; and determine whether the driver holds the steering wheel with reference to the predicted value calculated by the processor and an actual measured value of the state quantity measured at a time corresponding to the predicted value, and an equation of state used by the processor includes at least one of:

an elastic component associated with turning of the wheel;

an attenuation component associated with the turning of the wheel;

a component caused by eccentricity of the steering wheel; and a friction component associated with the turning of the wheel.

\* \* \* \* \*